United States Patent [19]

Konzelmann

[11] Patent Number: 5,375,466
[45] Date of Patent: Dec. 27, 1994

[54] MEASURING ELEMENT

[75] Inventor: Uwe Konzelmann, Asperg, Germany

[73] Assignee: Robert Bosch GmbH, Stuttgart, Germany

[21] Appl. No.: 207,452

[22] Filed: Mar. 7, 1994

[30] Foreign Application Priority Data

Mar. 16, 1993 [DE] Germany .............. 4308227

[51] Int. Cl.⁵ ................................. G01F 1/68
[52] U.S. Cl. .................................. 73/204.26
[58] Field of Search ........... 73/204.22, 204.25, 204.26, 73/204.23

[56] References Cited

U.S. PATENT DOCUMENTS 4,777,820 10/1988 Hecht et al. ............ 73/204.26
4,803,875 2/1989 Kuhn et al. ............. 73/204

FOREIGN PATENT DOCUMENTS 3638137 5/1988 Germany.
3911599 10/1990 Germany.
2-245617 12/1990 Japan.

Primary Examiner—Herbert Goldstein
Attorney, Agent, or Firm—Kenyon & Kenyon

[57] ABSTRACT

An apparatus for determining the flow rate of a flowing medium in the presence of pulsating flows and/or backflows, having a substrate as a carrier and a resistor arrangement located on the substrate for sensing medium flows. The resistor arrangement includes a temperature-sensitive resistor ($R_s$), a heating resistor ($R_h$), and compensation ($R_k$) and bridge resistors ($R_1$, $R_2$, $R_3$), which are arranged to create a feedback circuit that establishes a constant temperature environment, allowing electrical measurement of the flow mass. The substrate includes a fixed portion at one end, and two unfixed legs at the other end, the two legs divided by a notch. The width of each of the first leg and the notch is from 30 to 50 percent of the total width of the substrate, while the width of the second leg is at least 10 percent of the total width of the substrate. Such a relationship between the widths of the legs and notch avoids measuring discrepancies due to flow pulsations and/or backflows over the boundary surfaces of the sensing element.

9 Claims, 2 Drawing Sheets

MEASURING ELEMENT

BACKGROUND OF THE INVENTION

The present invention is related to a measuring element for a device for determining the mass of a flowing medium, and in particular, the mass of the intake air of internal combustion engines.

German Unexamined Patent Application No. 36 38 137 discusses a device in which resistors and printed conductors are applied to a carrier member, i.e., a substrate. In such devices, also described as air-mass flowmeters, a measuring resistor and compensating resistor having a corresponding reference resistor, together with two balancing resistors, form a Wheatstone bridge. The diagonal bridge voltage of the Wheatstone bridge is applied to an automatic gain-control amplifier. The output voltage from the automatic gain-control amplifier is adapted to trigger a heating resistor element. The heating power is rated to allow the measuring resistor to have a constant temperature. The heating power of the heating resistor is a measure for the mass of the flowing medium.

In the above mentioned device, the substrate is retained on one side in a mounting and divided by a slit into two lips. The slit is oriented at a right angle to the direction of flow and runs, starting from an unattached frontal area of the first and second lip facing away from the mounting, up to near the mounting. The width of the slit corresponds, approximately, to the thickness of the substrate. With its incident-flow surface, the first lip constitutes an obstacle to the flow, and it has a compensating resistor on its rear side. The heating resistor is provided on the front side of the second lip, and the measuring resistor is provided on the rear side of the measuring resistor.

When measuring the mass in the intake area of an internal combustion engine, flow fluctuations exist. These flow fluctuations are caused by the opening and closing of the intake valves of the individual pistons. The intensity of the flow fluctuations, i.e., the pulsation of the flow velocity, is dependent upon the intake frequency of the individual pistons. To a considerable extent, the fluctuations in flow adversely affect the measurement of the device mentioned at the outset, particularly given intense flow fluctuations that entail partial backflow in the measuring duct.

Thus, there exists a need to provide a device for measuring the mass in the intake area of an internal combustion engine which provides a precise measuring result nearly independent of a fluctuating flow.

SUMMARY OF THE INVENTION

The measuring element according to the present invention meets the above-mentioned need by providing a measuring element for use in a device for determining the mass of a medium flowing through a cross-section having a substrate. The substrate has a first end at which the substrate is held fixed with respect to the cross-section in a fixing region, an unattached frontal area at a second end opposite the first end, a first leg facing a direction of the flow of the medium and having a width, and a second leg. The second leg faces away from the direction of the flow, and defines a slit, having a width, between it and the first leg. The slit extends from the unattached frontal area of the substrate in the direction of the fixing region. The second leg has a temperature-dependent, layer-shaped, measuring resistor.

The width of the slit and the width of the first leg in the direction of flow is between 30% and 50% of a total width of the substrate measured in the direction of flow, the total width being comprised of the width of the first leg, the width of the slit, and the width of the second leg. The width of the second leg is at least 10% of the total width of the substrate, thereby advantageously achieving an invariably precise measurement nearly independent of a fluctuating flow. In particular, when a heavily fluctuating flow along with a partial backflow exists, the measuring device of the present invention provides a considerably improved measurement compared to known measuring elements.

DETAILED DESCRIPTION

Figure 1:
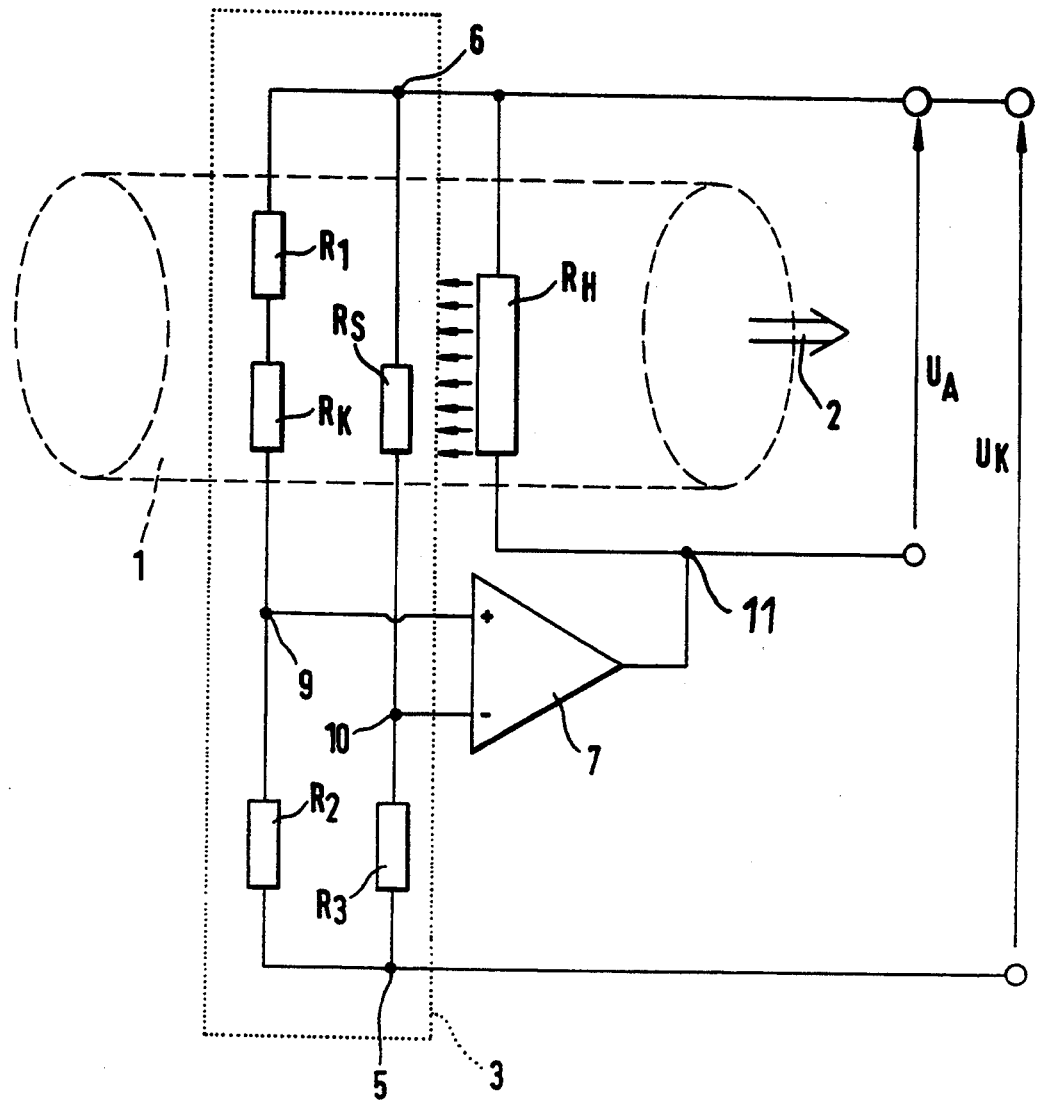
FIG. 1 is a circuit diagram of the present invention.

FIG. 1 shows a perspective view of a pipe 1 in phantom. A medium flows through the pipe 1. The direction of flow of the medium is indicated by an arrow 2. The pipe 1 can be an intake manifold, for example, through which air is drawn into an internal combustion engine. Four resistors are accommodated within the pipe 1, in the path of the flowing medium. A temperature-dependent measuring resistor $R_S$ measures the mass of the flowing medium. The other resistors, including a heating resistor element $R_H$, a temperature-dependent compensating resistor $R_K$, and a reference resistor $R_1$, are accommodated within the pipe 1 in the path of the flowing medium.

The resistors $R_S$, $R_H$, $R_K$, $R_1$ constitute part of a resistance-detecting configuration 3, designed, for example, as a Wheatstone bridge circuit, which is supplemented by two balancing resistors $R_2$ and $R_3$. Not only can the resistance-detecting configuration 3 be arranged as a Wheatstone bridge circuit, but it can also be arranged as other resistance-measuring circuits or bridge-type circuits.

From node 5, the series connection of resistors $R_2$, $R_K$ and $R_1$ and the series connection of resistors $R_3$ and $R_S$ are each connected in a bridge arm. The bridge is closed at node 6, the connecting leads of resistors $R_1$ and $R_S$ being connected at node 6. The diagonal bridge voltage is supplied to an automatic gain-control amplifier 7. The automatic gain-control amplifier 7 can be designed, for example, as a differential amplifier. A connecting lead of the automatic gain-control amplifier 7 is connected at node 9 of a first bridge arm of the series of the resistors $R_1$, $R_2$ and $R_K$, between $R_2$ and $R_K$. Another connecting lead of the automatic gain-control amplifier 7 is connected at node 10 of a second bridge arm of the series of the resistors $R_3$ and $R_S$, between $R_3$ and $R_S$.

At node 11, the output of the automatic gain-control amplifier 7 is fed to the heating resistor element $R_H$. The other connecting lead of $R_H$ is connected to node 6, thereby forming a closed control loop. Between node 6, a neutral conductor and node 5, the resistance-detecting configuration 3 is connected to a direct-voltage source. The voltage source supplies the output voltage $U_K$ required to operate the measuring element, or rather the resistance-detecting configuration 3.

The operation of an air-mass flowmeter for determining the mass of a flowing medium, in particular the intake air of internal combustion engines, is known, per se, and will only be clarified briefly in the following. The output current from the automatic gain-control amplifier 7 causes the heating resistor element $R_H$ to be heated, the heating power supplied by the heating resistor element $R_H$ being essentially determined by the diagonal bridge voltage across the automatic gain-control amplifier 7. The heating resistor element $R_H$ which is in good thermal contact with the measuring resistor $R_S$, is thus brought to a temperature lying far above the temperature of the flowing medium (i.e., an "overtemperature"). If the mass of the medium flowing through the pipe 1 changes at this point, then the temperature of the measuring resistor $R_S$ changes due to the altered convective heat transfer, and the resistance-detecting configuration 3 becomes unbalanced, since the measuring resistor $R_S$ is heavily temperature-dependent. As a result, the automatic gain-control amplifier 7 changes the current flowing through the heating resistor element $R_H$.

Thus, changes in the measuring resistor $R_S$ due to an outflowing or inflowing quantity of heat are always compensated by a change in the heating power of the heating resistor element $R_H$, so that the heavily temperature-dependent measuring resistor $R_S$ is retained at a constant temperature, i.e., a constant resistance value. The heating current, or rather the output voltage $U_A$ from the automatic gain-control amplifier 7, therefore provides a means for measuring the mass of the flowing medium. Due to the compensating resistor $R_K$, together with the series-connected reference resistor $R_1$, the output voltage $U_A$ from the automatic gain-control amplifier 7 is not dependent upon the temperature of the flowing medium.

It is not necessary to also subject the balancing resistor $R_2$, which lies between nodes 5 and 9, as well as the balancing resistor $R_3$, which lies between nodes 5 and 10, to the flowing medium. However, it is advantageous to arrange the resistors $R_2$ and $R_3$ in the closest possible thermal contact, to avoid a narrow tolerancing of the temperature coefficients of $R_2$ and $R_3$.

Figure 2:
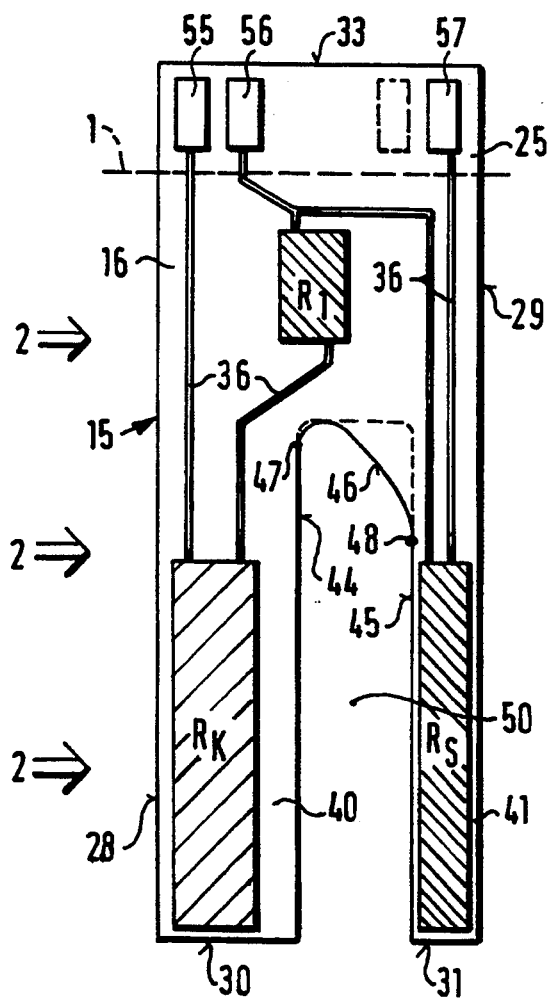
FIG. 2 is a front view of the measuring element according to the present invention.
Figure 3:
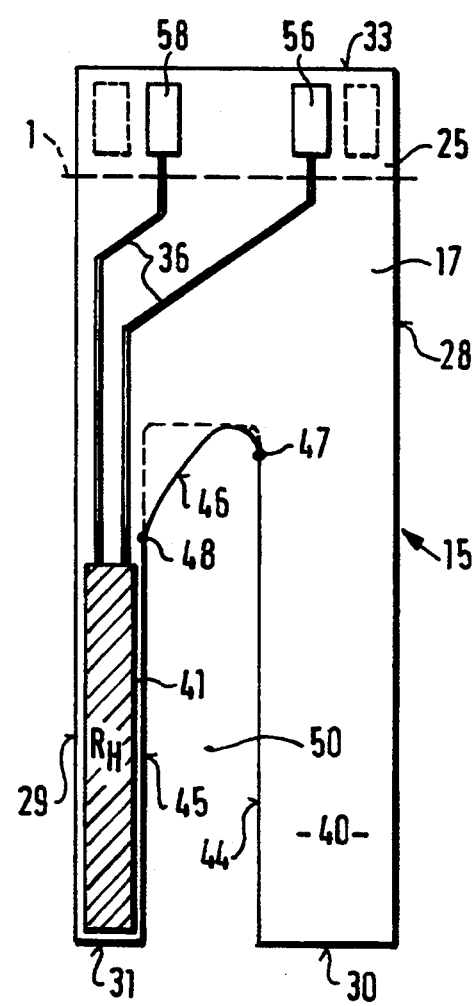
FIG. 3 is a rear view of the measuring element shown in FIG. 2.

As shown in FIGS. 2 and 3, the resistors $R_H$, $R_S$, $R_K$ and $R_1$ are arranged as thin, rectangular layers on a plate-like substrate 15 serving as a supporting material. The heating resistor element $R_H$, the measuring resistor $R_S$ and the compensating resistor $R_K$ are preferably sheet resistors or film resistors. The reference resistor $R_1$ is preferably a thick-film resistor. The resistance value of the resistors can be individually adjusted by the meander-shaped cuts through the surface of the individual layers. The layer of the measuring resistor $R_S$ and the layer of the compensating resistor $R_K$ are preferably provided with meander structures by means of a laser cut. Platinum is well suited as a material for the layers of the resistors.

The plate-like substrate 15 has a more or less rectangular shape and is retained on one side, for example, at an attached frontal area 33 on a fixing region 25. To retain the substrate 15, an additional holding device can be provided, for example, on the pipe 1, to orient the substrate 15 as much as possible to the middle of the pipe 1. Such an orientation permits the substrate 15 to be circumflowed without edge influences.

The substrate 15 has a slit 50, which divides the substrate 15 into two legs. A first leg 40 is oriented to face the direction of flow 2 and a second leg 41 is oriented to face away from the direction of flow 2. The slit 50 extends, starting from an unattached frontal area 30 of the first leg 40 facing away from the fixing region 25 (or starting from an unattached frontal area 31 of the second leg 41), preferably up to near the fixing region 25.

The first leg 40 includes an incident-flow surface 28 which obstructs the direction of flow 2. The direction of flow 2 is characterized by arrows 2 in FIG. 2. The incident-flow surface 28 of the substrate 15 is adjacent to the attached frontal area 33 and to the unattached frontal area 30 of the first leg 40, which both extend in the direction of flow 2. The first leg 40 is partially delimited by the incident-flow surface 28, by the attached frontal area 33 and the unattached frontal area 30, as well as by a lateral surface 44 of the first leg 40. The lateral surface 44 is adjacent to the unattached frontal area 30, is spaced from the incident-flow surface 28, and is oriented at a right angle to the direction of flow 2, as is the incident-flow surface 28.

The second leg 41 has a flow-off surface 29, which runs at a right angle to the flow 2 and faces away from the direction of flow 2. The unattached frontal area 31 of the second leg 41 is contiguous to the flow-off surface 29, while facing away from the fixing region 25. The second leg 41 is partially delimited by the flow-off surface 29, by the attached frontal area 33 and the unattached frontal area 31, as well as by a lateral surface 45, which is adjacent to the unattached frontal area 31, spaced from the flow-off surface 29, and oriented at right angles to the direction of flow 2, as is the flow-off surface 29.

The lateral surface 44 of the first leg 40 extends, starting from the unattached frontal area 30, at least partially over the middle of the substrate 15 to point 47. The lateral surface 45 of the second leg 41 extends more or less up to the middle of the substrate 15 to point 48. A connecting surface 46 runs in the shape of an arc (or curve) and joins the two end points 47, 48 to delimit, together with the lateral surfaces 44, 45, the slit 50.

At least one of the legs 40, 41, continually widens, starting from the respective end points 47, 48 in the direction of the fixing region 25, and measured in the direction of flow 2, to increase the static and, in particular, the dynamic stability of the individual legs 40, 41. The measuring element according to the present invention is, therefore, extremely rugged and insensitive to vibrational excitations, which occur, for example, in the measuring operation of an internal combustion engine. The measuring element of the present invention is also insensitive to shock excitations occurring in the manufacturing and assembly of the measuring element.

To permit the slit 50 to be simply manufactured, both lateral surfaces 44 and 45 can also be designed to have the same extent, at right angles to the direction of flow 2, the connecting surface 46 running in a straight line in the direction of flow 2, as indicated with a dotted line, so that the slit 50 has a rectangular shape. The lateral surfaces 44, 45 can also be designed to run with a slight inclination toward each other in the direction of the fixing region 25.

In accordance with the present invention, each of the width of the slit 50 and the width of first leg 40 in the direction of flow 2 corresponds to at least 30% and, at the most 50%, of the total width of the substrate 15 measured in the direction of flow 2. The total width is comprised of the width of the first leg 40, the width of the slit 50, and the width of the second leg 41 in the direction of flow 2. The width of the second leg 41 is at least 10% of the total width of the substrate 15.

The slit 50 extends advantageously, starting from the unattached frontal areas 30 and 31, farther in the direction of the fixing region 25 than does the provided measuring resistor $R_S$, which is applied to the second leg 41 as a rectangular layer. The relatively wide refinement of the slit 50 in accordance with the present invention diminishes a measuring error of the measuring element, in the case of a pulsating flow characterized by flow fluctuations. Often, the fluctuations in the flow velocity (or the magnitude of the pulsations of the flow) assume such an intensity, that partial backflows occur in the measuring duct.

In instances where a pulsating flow without backflows exists, the convective heat transfer of the measuring resistor $R_S$ mainly depends on the pulsation intensity of the flow. The always present, thermal inertia of the measuring element only permits an imperfectly precise measurement of the currently existing, substantially variable flow velocity. In such an instance, an averaging of the transfer of heat to the flow results in too small a mass flow being indicated. The relatively broad slit 50, in conjunction with the relatively broad first leg 40 that stands in the way of the flow, serve to compensate for the measuring error caused by thermal inertia. The leg 40 obstructs the flow in a certain manner, so that the measuring resistor $R_S$ that follows in the direction of flow 2 lies at least partly in the area sheltered from the flow by the first leg 40. As a result, the circumflow and the convective heat transfer of the measuring resistor $R_S$ change to specifically counteract the thermal inertia of the measuring element.

In instances where a heavily pulsating flow with partial backflow exists, an increased mass flow is indicated, due to the backflowing mass. This particularly occurs in a measuring elements designed with a relatively narrow slit. The relatively broad slit 50 in accordance with the present invention, in conjunction with the first, relatively broad first leg 40 provides a markedly improved measuring result, even when backflows occur in the measuring duct. Due to the wide slit 50, the boundary-layer that forms along the layer of the measuring resistor $R_S$ is not as thick as when a relatively narrow slit is used. Hence, the increased indication of mass flow due to back flow is reduced by the measuring element as a result of this smaller boundary-layer thickness.

To connect the measuring element, for example, contact surfaces 55, 56, 57 and 58 are provided at the fixing region 25 of the substrate 15. These contact surfaces are connected to the resistors $R_1$, $R_K$, $R_H$ and $R_S$ through connections formed on the substrate 15 in the form of printed conductors 36. The contact surface 55 is connected to the compensating resistor $R_K$ and to node 9 depicted in FIG. 1. The contact surface 56 is connected to the reference resistor $R_1$, to the temperature dependent measuring resistor $R_S$, to the heating resistor element $R_H$, and to node 6. The contact surface 57 is connected to the measuring resistor $R_S$ and to node 10. The contact surface 58 is connected to the heating resistor $R_H$ and to the output of the automatic gain-control amplifier 7 at node 11.

As shown in FIG. 2, the layer of the compensating resistor $R_K$ is applied to a front surface 16 of the substrate 15 on the first leg 40 near the unattached frontal area 30. The rectangular layer of the compensating resistor $R_K$ extends in the direction of the fixing region 25, more or less up to the end point 48 of the lateral surface 45. Correspondingly, the measuring resistor $R_S$ is applied to the front surface 16 of the substrate 15 on the second leg 41 near the unattached frontal area 31. The rectangular layer of this measuring resistor $R_s$ extends in the direction of the fixing region 25, more or less up to the end point 48 of the lateral surface 45.

As shown in FIG. 3, opposite the measuring resistor $R_S$ on a rear surface 17 of the substrate 15 on the second leg 42 is the rectangular layer of the heating resistor element $R_H$, which extends from near the unattached frontal area 31, more or less up to the end point 48 of the lateral surface 45, or alternatively somewhat beyond end point 48. The heating resistor element $R_H$ can also be situated while being electrically insulated, for example, in an area of the leg 41 that is superimposed by the measuring resistor $R_S$, to obtain the most efficient possible thermal coupling of both resistors $R_H$ and $R_S$. A large clearance from the fixing region 25 diminishes the rate of heat transfer occurring from the heating resistor element $R_H$ to the fixing region 25. This diminished heat transfer reduces the response rate of the measuring element to changes in the mass of the flowing medium. The rectangular layer of the reference resistor $R_1$ is applied, for example, to the front surface 16 of the substrate 15 in an intermediate area between the connecting surface 46 and the fixing region 25.

What is claimed is:

1. A measuring element for use in a device for determining the mass of a medium flowing through a cross-section comprising:
   a substrate, said substrate
   i) having a first end at which said substrate is held fixed with respect to the cross-section in a fixing region,
   ii) having an unattached frontal area at a second end opposite said first end,
   iii) having a first leg facing toward a direction of the flow of the medium and having a first width, and
   iv) having a second leg
      having a second width,
      facing away from the direction of the flow of the medium,
      defining a slit, having a slit width, between said second leg and said first leg, the slit extending from said unattached frontal area of said substrate in the direction of said fixing region, and
      having a temperature-dependent, layer-shaped, measuring resistor,
   wherein each of the slit width and the first width in the direction of flow is between 30% and 50% of a total width of the substrate measured in the direction of flow, the total width being comprised of the first width, the slit width, and the second width, and
   wherein the second width is at least 10% of the total width of the substrate.

2. The measuring element of claim 1 wherein the slit extends closer to said fixing region than said measuring resistor does.

3. The measuring element of claim 2 wherein the slit extends in the direction of said fixing region to close proximity with said fixing region.

4. The measuring element of claim 1 wherein said measuring resistor is provided in close proximity with an unattached frontal area of said second leg.

5. The measuring element of claim 1 further comprising a heating resistor element, said heating resistor element having a voltage supplied across it which varies depending on the mass of the medium flowing through the cross-section, and being situated on said second leg.

6. A measuring element for use in a device for measuring the mass of a medium flowing through a cross-section comprising:
a substrate, said substrate
- i) having a first end at which said substrate is held fixed with respect to the cross-section in a fixing region,
- ii) having an unattached frontal area at a second end opposite said first end,
- iii) having a first leg facing toward a direction of the flow of the medium and having a first width, and
- iv) having a second leg
    - having a second width,
    - facing away from the direction of the flow of the medium,
    - defining a slit, having a slit width, between said second leg and said first leg, the slit extending from said unattached frontal area of said substrate in the direction of said fixing region, and
    - having a temperature-dependent, layer-shaped, measuring resistor, wherein each of the slit width and the first width in the direction of flow is between 30% and 50% of a total width of the substrate measured in the direction of flow, the total width being comprised of the first width, the slit width, and the second width, wherein the second width is at least 10% of the total width of the substrate, and wherein the first width, measured in the direction of flow, decreases as it extends away from said fixing region.

7. The measuring element of claim 6 wherein the slit ends in an arc-shaped connecting surface between said first leg and said second leg.

8. A measuring element for use in a device for measuring the mass of a medium flowing through a cross-section comprising:
a substrate, said substrate
- i) having a first end at which said substrate is held fixed with respect to the cross-section in a fixing region,
- ii) having an unattached frontal area at a second end opposite said first end,
- iii) having a first leg facing toward a direction of the flow of the medium and having a first width, and
- iv) having a second leg
    - having a second width,
    - facing away from the direction of the flow of the medium,
    - defining a slit, having a slit width, between said second leg and said first leg, the slit extending from said unattached frontal area of said substrate in the direction of said fixing region, and
    - having a temperature-dependent, layer-shaped, measuring resistor, wherein each of the slit width and the first width in the direction of flow is between 30% and 50% of a total width of the substrate measured in the direction of flow, the total width being comprised of the first width, the slit width, and the second width, wherein the second width is at least 10% of the total width of the substrate, and wherein the second width, measured in the direction of flow, decreases as it extends away from said fixing region.

9. The measuring element of claim 8 wherein the slit ends in an arc-shaped connecting surface between said first leg and said second leg.

* * * * *